United States Patent
Long et al.

(10) Patent No.: US 10,907,726 B2
(45) Date of Patent: Feb. 2, 2021

(54) PLANETARY GEARSET PLANET PIN RETENTION

(71) Applicant: DEERE & COMPANY, Moline, IL (US)

(72) Inventors: Randall L. Long, Coffeyville, KS (US); Danny G. Voth, Liberty, KS (US); Kyle K. McKinzie, Oswego, KS (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/379,834

(22) Filed: Apr. 10, 2019

(65) Prior Publication Data

US 2020/0325980 A1 Oct. 15, 2020

(51) Int. Cl.
*F16H 57/08* (2006.01)
*F16H 1/28* (2006.01)

(52) U.S. Cl.
CPC ............... *F16H 57/08* (2013.01); *F16H 1/28* (2013.01); *F16H 57/082* (2013.01)

(58) Field of Classification Search
CPC ........... F16H 57/08; F16H 57/082; F16H 1/28
See application file for complete search history.

(56) References Cited

U.S. PATENT DOCUMENTS

| 4,129,050 A | 12/1978 | Akashi et al. |
| 8,628,449 B1 | 1/2014 | Burgman et al. |
| 9,382,997 B2 * | 7/2016 | McKinzie ........... F16H 57/0479 |
| 9,625,028 B2 | 4/2017 | McKinzie |
| 2004/0060774 A1 | 4/2004 | Oshidari et al. |
| 2015/0345591 A1 * | 12/2015 | Altamura .............. F16H 1/2836 475/159 |
| 2016/0258528 A1 * | 9/2016 | Carlino ............... F16H 57/0482 |
| 2018/0031112 A1 | 2/2018 | Chae |
| 2020/0173535 A1 * | 6/2020 | Peng ..................... F16H 1/2863 |

FOREIGN PATENT DOCUMENTS

| DE | 102009028509 A1 | 2/2011 |
| DE | 102011007801 A1 | 10/2012 |
| EP | 2464899 B1 | 10/2013 |
| JP | 2008157401 A | 7/2008 |
| KR | 1020090118520 A | 11/2009 |
| KR | 1020100057393 A | 5/2010 |

OTHER PUBLICATIONS

German Search Report issued in counterpart application No. 102020202852.4 dated Nov. 17, 2020 (08 pages).

* cited by examiner

*Primary Examiner* — Tisha D Lewis

(57) ABSTRACT

A planetary gearset includes a sun gear, a ring gear, a planet gear positioned between the sun gear and the ring gear to revolve around the sun gear, a planet carrier, a planet pin to which the planet gear is coupled for rotation about the planet pin, and a retaining pin positioned in the planet pin and the planet carrier so as to couple the planet pin to the planet carrier.

20 Claims, 5 Drawing Sheets

PLANETARY GEARSET PLANET PIN RETENTION

FIELD OF THE DISCLOSURE

The present disclosure relates to a planetary gearset, in particular, to retention of a planet pin to a planet carrier.

BACKGROUND OF THE DISCLOSURE

A planetary gearset comprises a sun gear, a ring gear, a number of planet gears positioned between the sun gear and the ring gear to revolve around the sun gear, and a planet carrier to which the planets are coupled. In some examples, the planetary gearset comprises a planet pin for each planet gear. The planet pins are coupled to the planet carrier. Each planet gear is coupled to and rotates around a respective one of the planet pins.

SUMMARY OF THE DISCLOSURE

According to an aspect of the present disclosure, a planetary gearset comprises a sun gear rotatable about an axis of rotation, a ring gear, a planet gear positioned between the sun gear and the ring gear to revolve around the sun gear, a planet carrier, a planet pin to which the planet gear is coupled for rotation about the planet pin, a retaining pin positioned in the planet pin and the planet carrier in a retention arrangement so as to couple the planet pin to the planet carrier, and a seat. The seat is positioned in an internal bore of the planet carrier that surrounds the axis of rotation. The seat is positioned in register with the retaining pin for the retaining pin to seat against the seat blocking escape of the retaining pin from the retention arrangement.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
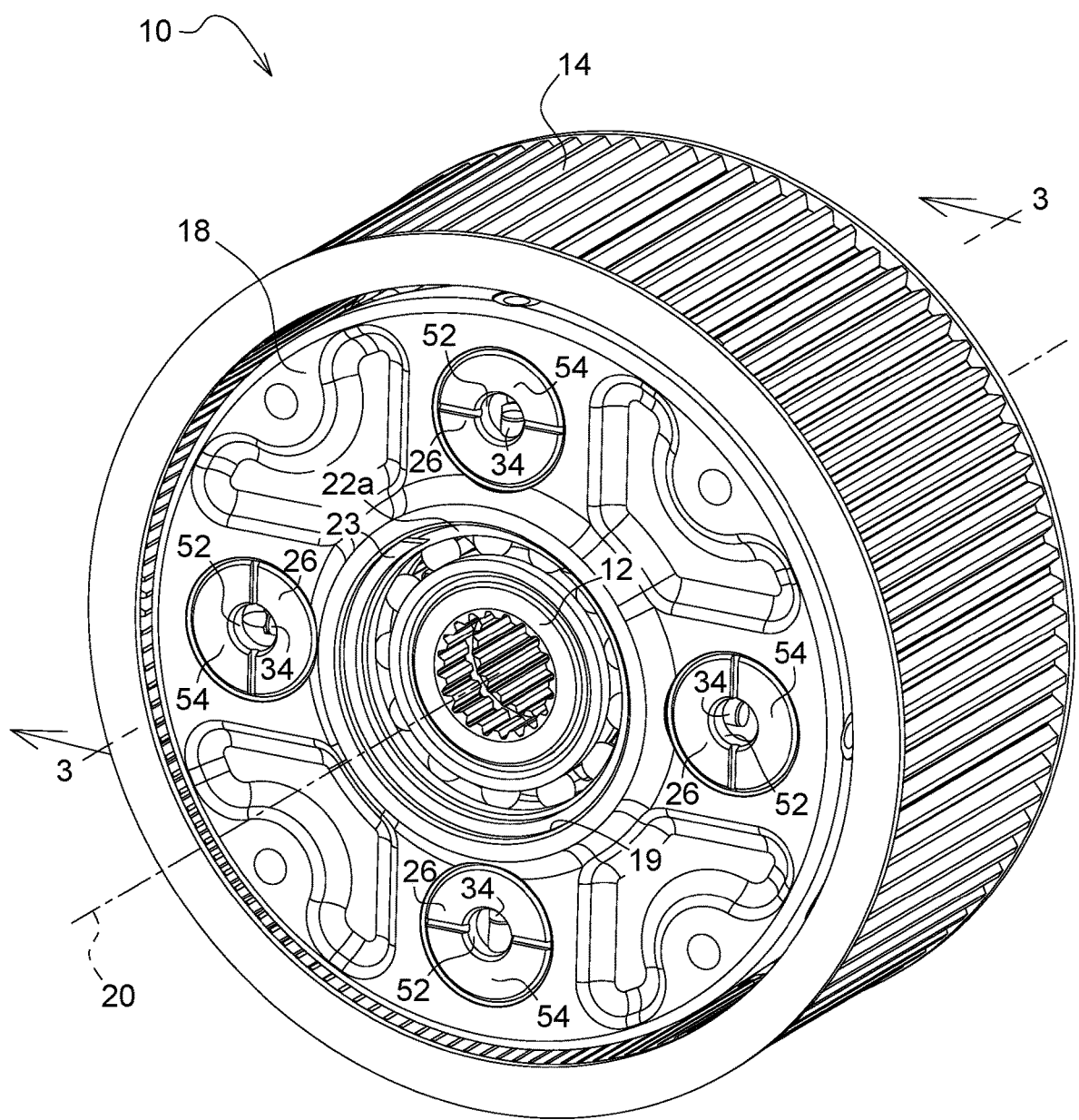
FIG. 1 is a perspective view showing a planetary gearset.
Figure 2:
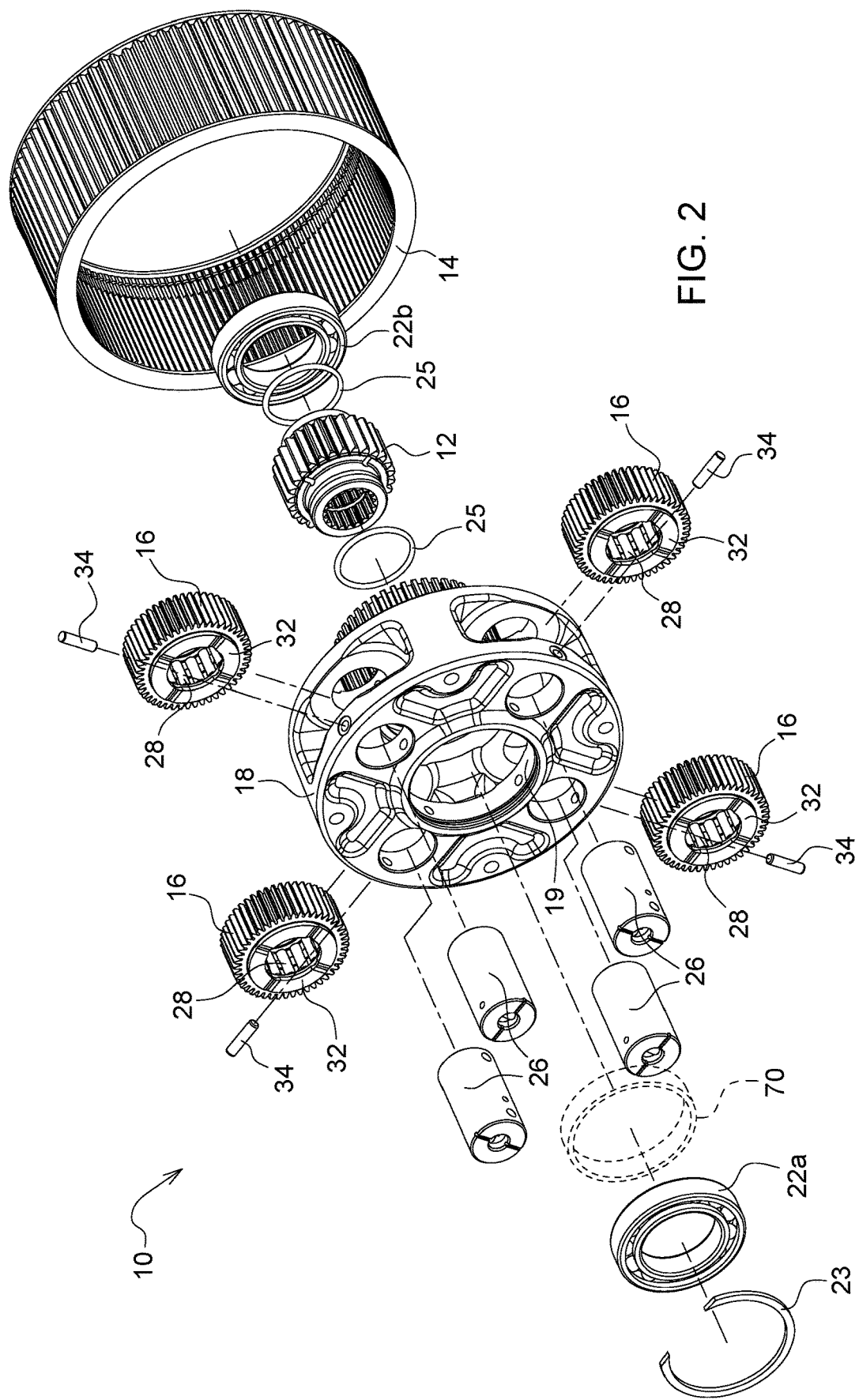
FIG. 2 is an exploded perspective view showing the planetary gearset.
Figure 3:
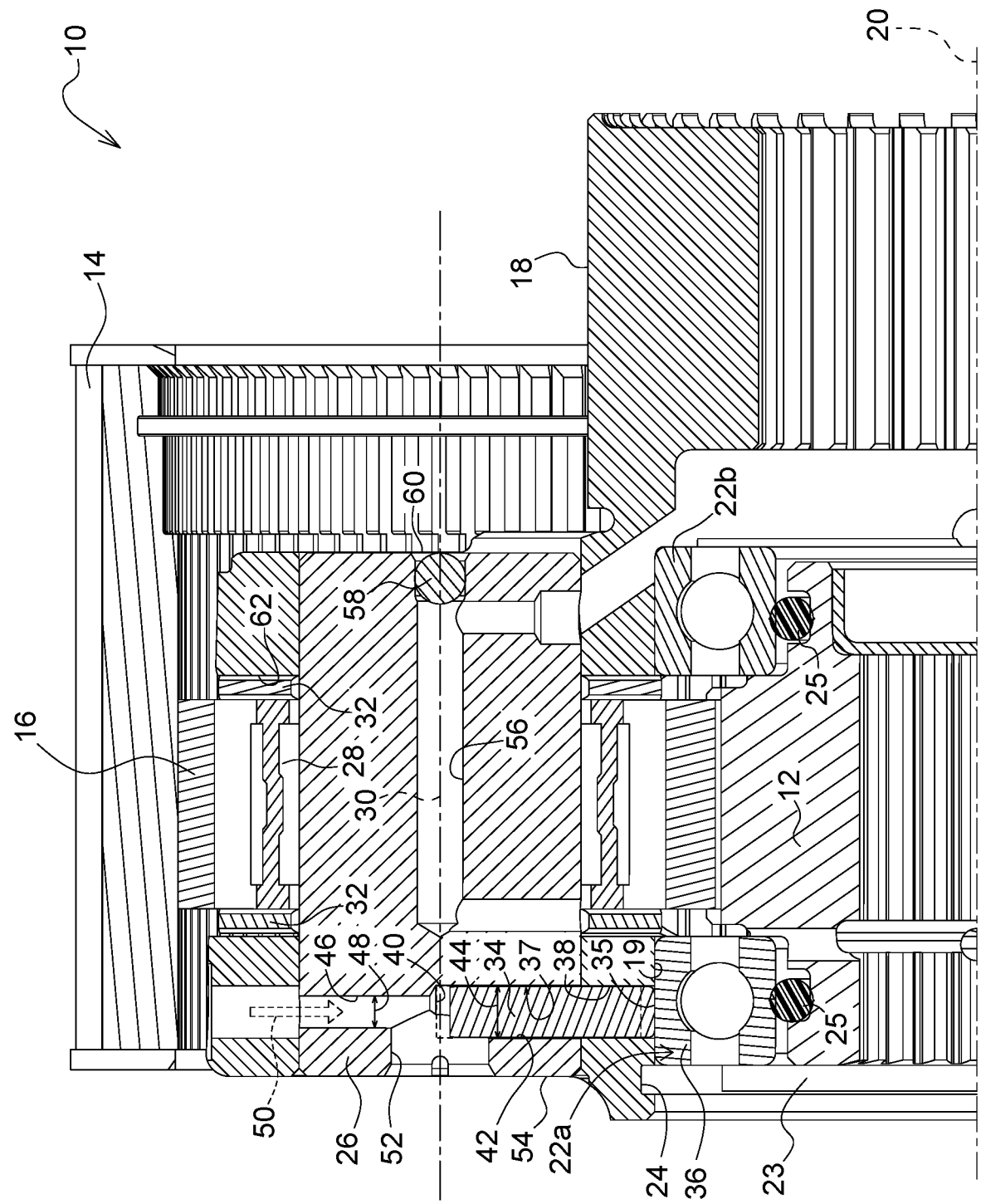
FIG. 3 is a sectional view, taken along lines 3-3 of FIG. 1 showing a retaining pin in a retention arrangement so as to couple a planet pin to a planet carrier of the planetary gearset.

Referring to FIGS. 1-3, there is shown a planetary gearset 10. The gearset 10 comprises a sun gear 12, a ring gear 14, planet gears 16 (e.g., four), and a planet carrier 18. The sun gear 12 is positioned in an internal bore 19 of the planet carrier 18 and rotatable about an axis of rotation 20. The planet gears 16 are positioned between, and mesh with one or both of, the sun gear 12 and the ring gear 14, and revolve around the sun gear 12. Illustratively, the planet gears 16 mesh with the sun gear 12 and the ring gear 14, and are positioned evenly about the axis 20. The planet gears 16 are mounted to the planet carrier 18 in a manner that promotes ease of assembly and disassembly.

The gearset 10 comprises two bearings 22a, 22b (e.g., ball-bearing type) that locate the sun gear 12. The internal bore 19 surrounds the axis 20, and the bearings 22a, 22b surround the axis 20 and are positioned in the internal bore 19 axially on either side of the sun gear 12 in contact therewith relative to the axis of rotation 20. A retaining ring 23 is positioned in an annular groove 24 of the planet carrier 18 to retain the bearings 22a, 22b and the sun gear 12 axially in place relative to the axis 20. The bearings 22a, 22b are positioned radially between the sun gear 12 and the planet carrier 18 relative to the axis 20. Illustratively, the planet carrier 18 is positioned radially on the bearings 22a, 22b relative to the axis 20.

The gearset 10 comprises two O-rings 25. Each O-ring 25 is positioned in the internal bore 19 between the sun gear 12 and a respective bearing 22a, 22b. The O-rings 25 are compressible allowing the sun gear 12 to float somewhat (the O-rings 25 are shown in a nominal configuration for ease of illustration). The O-rings 25 may be made of an elastomeric material.

The planet gears 16 are rotatably coupled to the planet carrier 18. The gearset 10 comprises a planet pin 26 for each planet gear 16 (e.g., there are four planet pins 26, one for each planet gear 16). Each planet gear 16 is coupled to the respective planet pin 26 of the gearset 10 for rotation about the planet pin 26. A bearing 28 (e.g., needle bearing) is positioned between the planet gear 16 and the planet pin 26 for rotation of the planet gear 16 about the planet pin 26 and a planet axis of rotation 30 of the planet pin 26. A thrust washer 32 is positioned on either side of the planet gear 16 and associated bearing 28 such that the washer 32 is positioned axially between a respective portion of the planet carrier 18 and the planet gear 16 and associated bearing 28.

Each planet pin 26 is coupled to the planet carrier 18 by a respective retaining pin 34 of the gearset 10 (e.g., there are four retaining pins 28, a single one for each planet pin 26). The retaining pin 34 is positioned in the planet pin 26 and the planet carrier 18 in a retention arrangement so as to couple the planet pin 26 to the planet carrier 18 against axial and rotational movement relative thereto with respect to the planet axis 30. Illustratively, the single retaining pin 34 is the only retaining pin coupling the planet pin 26 to the planet carrier 18, minimizing part count. More generally, the single retaining pin 34 is the only retention mechanism coupling the planet pin 26 to the planet carrier 18.

The bearing 22a comprises a seat 35. The bearing 22a with the seat 35 are positioned in the internal bore 19 and surround the axis 20. The bearing 22a with the seat 35 are positioned in register with the retaining pin 34 for the retaining pin 34 to seat against the seat 35 blocking escape of the retaining pin 34 from the retention arrangement and thus blocking decoupling of the planet pin 26 from the planet carrier 18. The bearing 22a comprises an outer race 36, and the outer race 36 comprises the seat 35. An outer surface of the outer race 36 provides the seat 35.

The retaining pin 34 is positioned in a hole 37 of the planet pin 26 and a hole 38 of the planet carrier 18 to couple the planet pin 26 to the planet carrier 18. Relative to the axis 20, each hole 37, 38 extends radially such that the retaining pin 34 extends radially in the holes 37, 38. As such, the holes 37, 38 are radial holes. Either hole 37, 38 may be referred to herein as a pin hole.

The planet carrier 18 is positioned on the bearings 22a, 22b. For example, the planet carrier 18 is positioned on the outer race 36 of the bearings 22a, 22b. The hole 38 of the planet carrier 18 is a through-hole. The seat 35 of the bearing 22a is positioned radially at the hole 38 for contact with the retaining pin 34. The outer race 36 of the bearing 22*a* covers the hole 38 of the planet carrier 18. The holes 37, 38 and the seat 35 of the bearing 22*a* are radially aligned with one another relative to the axis of rotation 20.

The retaining pin 34 is movable radially within the holes 37, 38 in the retention arrangement. During operation of the gearset 10, centrifugal force urges the retaining pin 34 radially outwardly relative to the axis 20 away from the seat 35 of the bearing 22*a* into contact with a stop 40. During non-operation of the gearset 10, depending on the location of the planet pin 26 about the axis 20, gravity may urge the retaining pin 34 radially inwardly relative to the axis 20 into contact with the seat 35 of the outer face 36 of the bearing 22*a*.

Illustratively, the hole 37 of the planet pin 26 is a multi-diameter radial through-hole. The hole 37 comprises a radial first portion 42 having a first diameter 44 and a radial second portion 46 positioned radially outward from the first portion relative to the axis 20 and having a second diameter 48 smaller than the first diameter 44. The retaining pin 34 is positioned in the first portion 42. The second portion 46 is configured to receive a tool 50, represented by an arrow (e.g., a screwdriver), to remove the retaining pin 34 from the first portion 42 during, for example, disassembly.

The stop 40 is positioned radially between the first portion 42 and the second portion 46 to limit radially outward movement of the retaining pin 34. Such radial outward movement may be induced by centrifugal force during operation or gravity during non-operation. The stop 40 is configured, for example, as a shoulder of the hole 37.

The planet pin 26 comprises a verification hole 52. The verification hole 52 intersects the hole 37 so as to be positioned in communication therewith for inspection of the retaining pin 34 in the hole 37 via the verification hole 52. Illustratively, the verification hole 52 is an axial verification hole that extends axially from an axial end 54 of the planet pin 26 to the hole 37 of the planet pin 26. The verification hole 52 may be used to verify that the retaining pin 34 is in place.

The planet pin 26 comprises a lubricant passageway 56. The lubricant passageway 56 is provided to deliver lubricant (e.g., oil) to components of the gearset 10. The pin hole 37 is positioned, for example, axially between the lubricant passageway 56 and the verification hole 52.

In an embodiment, the lubricant passageway 56 and the hole 37 are separated from one another by an internal wall of the planet pin 26, with a plug 58 (e.g., steel ball) positioned in an opening 60 of the passageway 56 by an interference fit 58 with the passageway 56. The opening 60 and passageway 56 are formed (e.g., drilled) from the end of the planet pin 26 with the opening 60.

Figure 4:
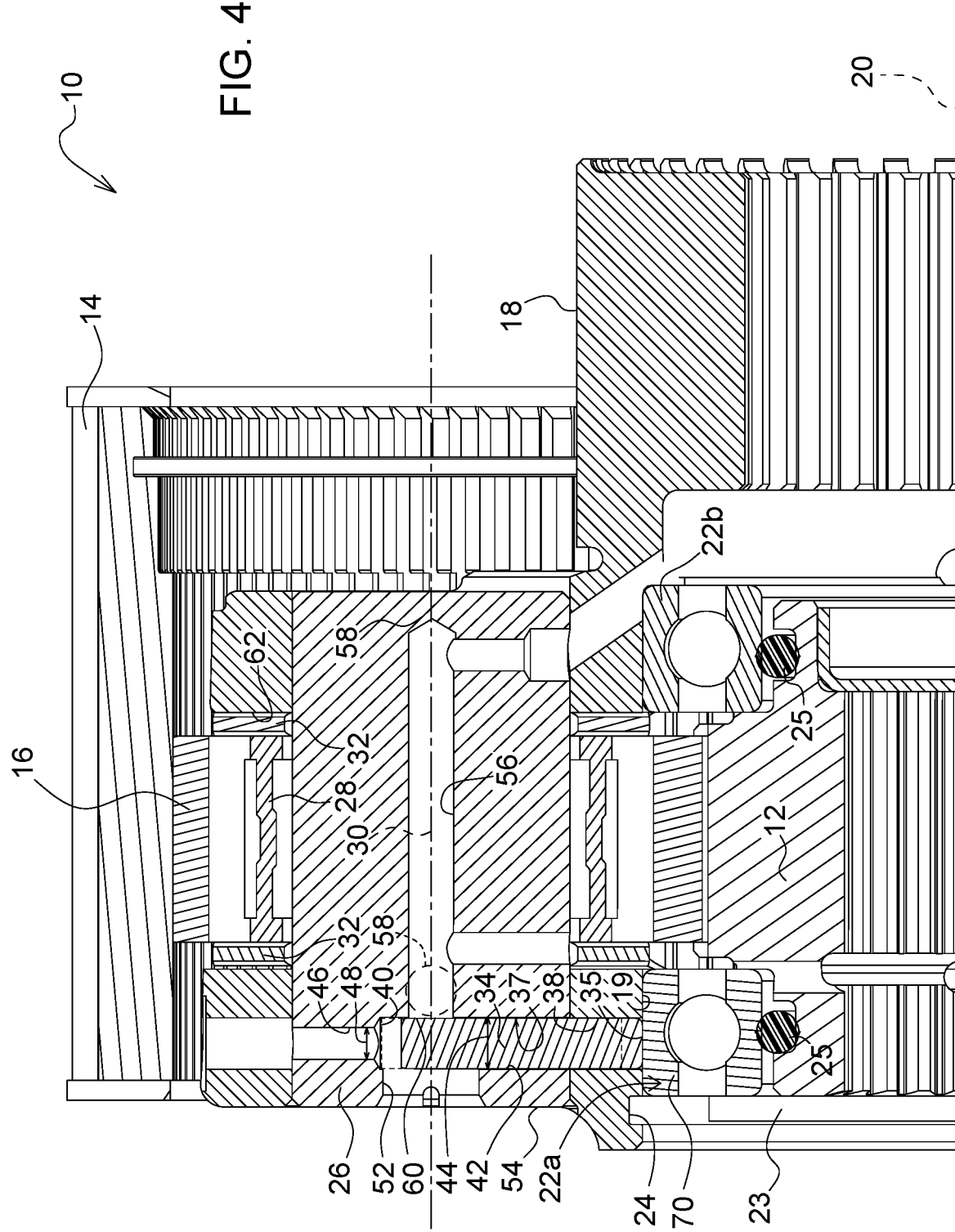
FIG. 4 is a sectional view showing an alternative embodiment.

Referring to FIG. 4, in another embodiment, the lubricant passageway 56 intersects the pin hole 37, with the opening 60 positioned next to the pin hole 37. In such a case, the lubricant passageway may be formed (e.g., drilled) from the opposite side of the planet pin 26. In particular, a tool (e.g., drilling tool) may be inserted through the verification hole 52 and the pin hole 37 to form the lubricant passageway 56 in the planet pin 26. The plug 58 may be positioned in the opening 60 of the passageway 56 by an interference fit with the passageway 56 (plug diameter suggestive of interference fit). In other embodiments, the plug 58 may be omitted, and the retaining pin 23 may be used to at least partially obstruct the opening 60 (some leakage from the lubricant passageway 56 through the opening 60 may be acceptable).

Referring back to FIG. 3, use of the single retaining pin 34 for the planet pin 26 promotes ease of assembly and disassembly of the planet pin 26 to the planet carrier 18. During assembly, the bearing 22*b* is installed into the internal bore 19 of the planet carrier 18, and the planet gear 16, the bearing 28, and the washers 32 are installed in a planet-receiving space 62 of the planet carrier 18. The planet pin 26 is inserted into the planet carrier 18, the planet gear 16, the bearing 28, and the washers 32. Depending on the length of the retaining pin 34, the sun gear 12 may be installed before or after installation of the retaining pin 34. Illustratively, the retaining pin 34 is installed before installation of the sun gear 12 and the bearing 22*a*, given the length of the retaining pin 34. The retaining pin 34 is inserted from the internal bore 19 into the pin holes 37, 38. The sun gear 12 and the bearing 22*a* are then inserted into the internal bore 19, with the bearing 22*a* providing the seat 35 for the retaining pin 34. In other embodiments, with a shorter retaining pin 34, the sun gear 12 and the bearing 22*b* may be installed in the internal bore 19, followed by insertion of the retaining pin 34 into the holes 37, 38, and then installation of the bearing 22*a*. Disassembly may follow a reverse process. The tool 50 may be inserted into the hole 37 to push the retaining pin 34 out of the holes 37, 38 into the internal bore 19 to remove the retaining pin 34. Use of the single retaining pin 34 may avoid the need for multiple tools to assemble and disassemble the planet pin 26 to and from the planet carrier 18.

Figure 5:
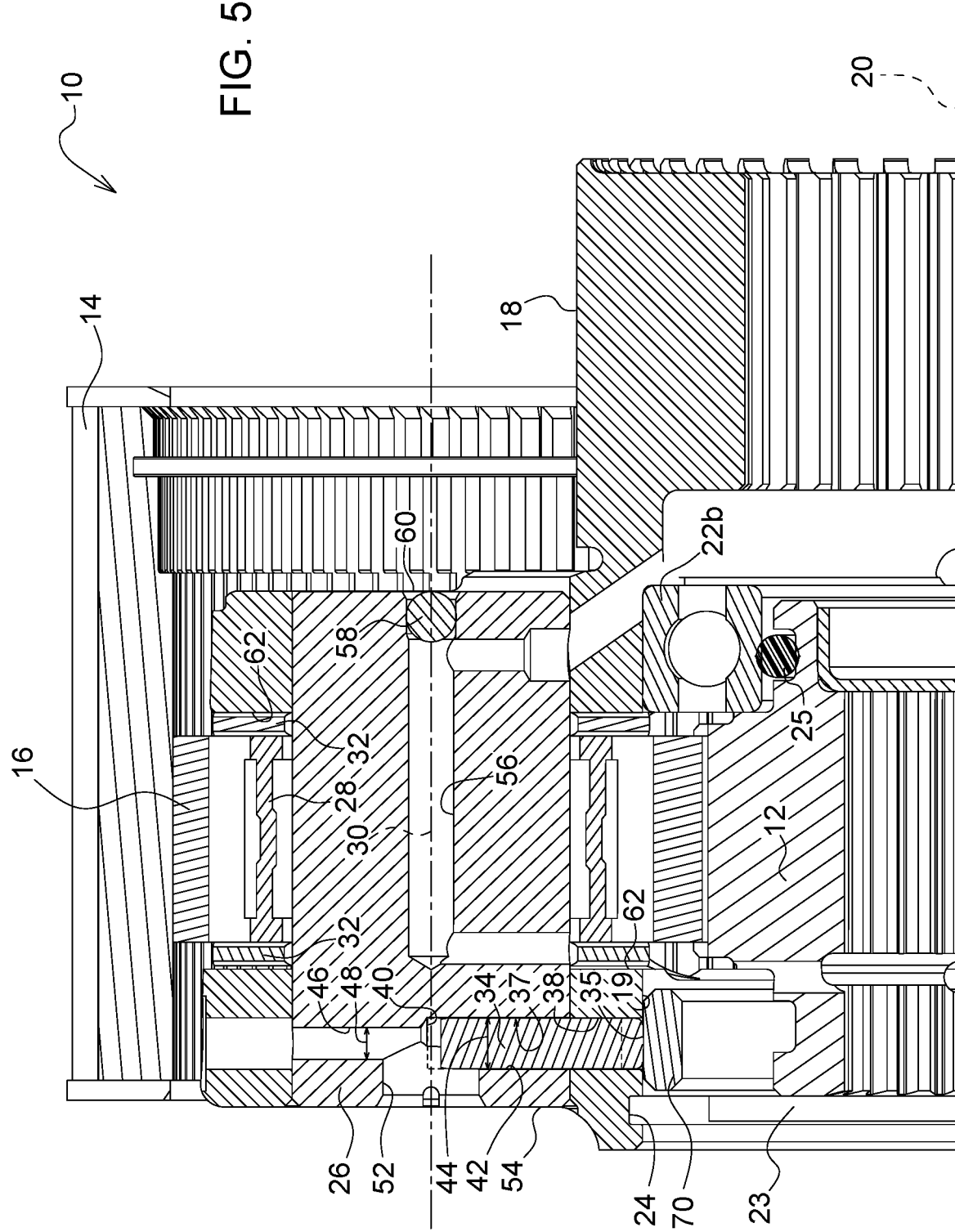
FIG. 5 is a sectional view showing another alternative embodiment.

Referring to FIG. 5, according to another embodiment, the seat 35 may be provided by a sleeve 70. In some examples of the gearset 10, one or both bearings 22*a*, 22*b* may not be needed to locate the sun gear 12. In a case where the bearing 22*a* is not needed to locate the sun gear 10, the sleeve 70 may replace the bearing 22*a* to provide the seat 35 for the retaining pin 34. The sleeve 70 may surround the axis 20 and comprise an annular outer surface which comprises the seat 35. The sleeve 70 may be positioned in the internal bore 19 in contact with the planet carrier 18 at the hole 38. The sleeve 70 may cover or partially cover the hole 38 for contact between the seat 35 and the retaining pin 34.

The gearset 10 may be used in a wide variety of contexts. For example, the gearset 10 may be used in an axle of a vehicle (not shown). The vehicle may be, for example, a construction machine (e.g., four-wheel drive loader), a forestry machine, or an agricultural machine, to name a few examples.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A planetary gearset, comprising:
a sun gear rotatable about an axis of rotation,
a ring gear,
a planet gear positioned between the sun gear and the ring gear to revolve around the sun gear,
a planet carrier comprising an internal bore surrounding the axis of rotation,
a planet pin to which the planet gear is coupled for rotation about the planet pin,
a retaining pin positioned in the planet pin and the planet carrier in a retention arrangement so as to couple the planet pin to the planet carrier,
a seat positioned in the internal bore in register with the retaining pin for the retaining pin to seat against the seat blocking escape of the retaining pin from the retention arrangement; and a bearing positioned in the internal bore between the sun gear and the planet carrier, wherein the bearing comprises the seat.

2. The planetary gearset of claim 1 wherein the bearing comprises an outer race, and the outer race comprises the seat.

3. The planetary gearset of claim 1, wherein the retaining pin is seated on the seat.

4. The planetary gearset of claim 1, wherein the retaining pin is positioned in a radial through-hole of the planet carrier, and the seat is positioned radially at the radial through-hole of the planet carrier.

5. The planetary gearset of claim 1, wherein the retaining pin is positioned in a radial hole of the planet pin and a radial through-hole of the planet carrier, and the radial hole of the planet pin, the radial through-hole of the planet carrier, and the seat are radially aligned with one another relative to the axis of rotation.

6. The planetary gearset of claim 5, wherein the radial hole of the planet pin is a multi-diameter radial through-hole comprising a radial first portion having a first diameter and a radial second portion positioned radially outward from the first portion and having a second diameter smaller than the first diameter, the retaining pin is positioned in the first portion, and the second portion is configured to receive a tool to remove the retaining pin from the first portion.

7. The planetary gearset of claim 6, wherein the radial through-hole of the planet pin comprises a shoulder between the first portion and the second portion to limit radially outward movement of the retaining pin.

8. The planetary gearset of claim 5, wherein the planet pin comprises an axial verification hole extending axially from an axial end of the planet pin to the radial hole of the planet pin for inspection of the retaining pin in the radial hole of the planet pin via the axial verification hole.

9. The planetary gearset of claim 1, wherein the planet pin comprises a multi-diameter hole comprising a first portion having a first diameter and a second portion having a second diameter smaller than the first diameter, the retaining pin is positioned in the first portion, and the second portion is configured to receive a tool to remove the retaining pin from the first portion.

10. The planetary gearset of claim 9, wherein the multi-diameter hole comprises a stop positioned radially between the first portion and the second portion to limit radially outward movement of the retaining pin.

11. The planetary gearset of claim 9, wherein the planet pin comprises a verification hole in communication with the multi-diameter hole for inspection of the retaining pin in the multi-diameter hole via the verification hole.

12. The planetary gearset of claim 1, wherein the planet pin comprises a pin hole in which the retaining pin is positioned and a verification hole intersecting the pin hole for inspection of the retaining pin in the pin hole.

13. The planetary gearset of claim 12, wherein the planet pin comprises a lubricant passageway, and the pin hole is positioned axially between the verification hole and the lubricant passageway.

14. The planetary gearset of claim 1, wherein the planet pin comprises a lubricant passageway and a hole in which the retaining pin is positioned and that intersects the lubricant passageway.

15. The planetary gearset of claim 1, wherein the retaining pin is the only retaining pin coupling the planet pin to the planet carrier.

16. A planetary gearset, comprising:
a sun gear rotatable about an axis of rotation,
a ring gear,
a planet gear positioned between the sun gear and the ring gear to revolve around the sun gear,
a planet carrier comprising an internal bore surrounding the axis of rotation,
a planet pin to which the planet gear is coupled for rotation about the planet pin,
a retaining pin positioned and movable radially in the planet pin and the planet carrier in a retention arrangement so as to couple the planet pin to the planet carrier, and
a seat positioned in the internal bore in register with the retaining pin for the retaining pin to seat against the seat blocking escape of the retaining pin from the retention arrangement.

17. The planetary gearset of claim 16, further comprising a bearing positioned in the internal bore, wherein the bearing comprises the seat.

18. The planetary gearset of claim 16, wherein the retaining pin is the only retaining pin coupling the planet pin to the planet carrier.

19. A planetary gearset, comprising:
a sun gear rotatable about an axis of rotation,
a ring gear,
a planet gear positioned between the sun gear and the ring gear to revolve around the sun gear,
a planet carrier comprising an internal bore surrounding the axis of rotation,
a planet pin to which the planet gear is coupled for rotation about the planet pin,
a retaining pin is positioned in the planet pin and the planet carrier in a retention arrangement so as to couple the planet pin to the planet carrier, and
a seat positioned in the internal bore and configured such that the retaining pin seats radially against the seat blocking escape of the retaining pin from the retention arrangement.

20. The planetary gearset of claim 19, further comprising a bearing positioned in the internal bore, wherein the bearing comprises the seat.

* * * * *